United States Patent
Chen et al.

(10) Patent No.: US 9,002,297 B2
(45) Date of Patent: Apr. 7, 2015

(54) MOBILE DEVICE AND TUNABLE ANTENNA THEREIN

(71) Applicant: HTC Corporation, Taoyuan, Taoyuan County (TW)

(72) Inventors: Ju-Hung Chen, Taoyuan (TW);
Chien-Pin Chiu, Taoyuan (TW);
Chang-Yen Cheng, Taoyuan (TW);
Chi-Hsien Chiu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 289 days.

(21) Appl. No.: 13/670,068

(22) Filed: Nov. 6, 2012

(65) Prior Publication Data
US 2014/0128007 A1    May 8, 2014

(51) Int. Cl.
*H04B 1/44* (2006.01)
*H01Q 11/12* (2006.01)
*H04B 1/04* (2006.01)
*H04B 1/18* (2006.01)

(52) U.S. Cl.
CPC ........................ *H04B 1/18* (2013.01)

(58) Field of Classification Search
USPC .......... 455/117, 161.1, 161.2, 161.3, 217, 82, 455/83
See application file for complete search history.

(56) References Cited

U.S. PATENT DOCUMENTS

| | | | |
|---|---|---|---|
| 7,671,804 B2 | 3/2010 | Zhang et al. | |
| 8,787,215 B1 * | 7/2014 | Khlat et al. | 370/280 |
| 2004/0152426 A1 * | 8/2004 | Suzuki et al. | 455/83 |
| 2006/0055606 A1 | 3/2006 | Boyle | |
| 2008/0280570 A1 | 11/2008 | Blin | |
| 2008/0291591 A1 * | 11/2008 | Huang et al. | 361/56 |
| 2010/0149057 A9 * | 6/2010 | Milosavljevic et al. | 343/722 |
| 2012/0038525 A1 * | 2/2012 | Monsalve Carcelen et al. | 343/705 |
| 2012/0112852 A1 | 5/2012 | Manssen et al. | |

FOREIGN PATENT DOCUMENTS

| | | |
|---|---|---|
| CN | 1650469 A | 8/2005 |
| TW | 200814427 A | 3/2008 |
| WO | WO 2008/010149 A1 | 1/2008 |

* cited by examiner

*Primary Examiner* — Nguyen Vo
(74) *Attorney, Agent, or Firm* — Birch, Stewart, Kolasch & Birch, LLP

(57) ABSTRACT

A mobile device includes an antenna, an ESD (Electrostatic Discharge) protection component, a plurality of branches, and a switch. The antenna is configured to transmit and receive an RF (Radio Frequency) signal. The branches provide different inductances or different capacitances, and are respectively coupled to a ground voltage terminal. The switch is coupled through the ESD protection component to the antenna, and switches between the branches according to a control signal such that the antenna is capable of operating in a plurality of frequency intervals. The ESD protection component is configured to protect the switch from being damaged.

20 Claims, 7 Drawing Sheets

MOBILE DEVICE AND TUNABLE ANTENNA THEREIN

BACKGROUND OF THE INVENTION

1. Field of the Invention

The subject application generally relates to a mobile device, and more particularly, relates to a mobile device comprising a tunable antenna.

2. Description of the Related Art

With the progress of mobile communication technology, portable devices, for example, notebook computers, tablet computers, mobile phones, multimedia players, and other hybrid functional portable devices, have become more common. To satisfy the demand of users, portable devices usually can perform wireless communication functions. Some devices cover a large wireless communication area, for example, mobile phones use 2G, 3G, LTE (Long Term Evolution) and 4G systems and use frequency bands of 700 MHz, 850 MHz, 900 MHz, 1800 MHz, 1900 MHz, 2100 MHz, 2300 MHz, and 2500 MHz. Some devices cover a small wireless communication area, for example, mobile phones use Wi-Fi, Bluetooth, and WiMAX (Worldwide Interoperability for Microwave Access) systems and use frequency bands of 2.4 GHz, 3.5 GHz, 5.2 GHz, and 5.8 GHz.

However, there is usually extremely limited space in portable devices, such as a mobile device. It is a critical challenge for antenna designers to design antennas of a mobile device to operate in multiple bands without increasing the antenna size.

BRIEF SUMMARY OF THE INVENTION

In one exemplary embodiment, the subject application is directed to a mobile device, comprising: an antenna, transmitting and receiving an RF (Radio Frequency) signal; an ESD (Electrostatic discharge) protection component; a plurality of branches, providing different inductances or capacitances, and respectively coupled to a ground voltage terminal; and a switch, coupled through the ESD protection component to the antenna, and switching between the branches according to a control signal such that the antenna is capable of operating in a plurality of frequency intervals, wherein the ESD protection component is configured to protect the switch from being damaged.

BRIEF DESCRIPTION OF DRAWINGS

The subject application can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures thereof in the invention are shown in detail as follows.

Figure 1:
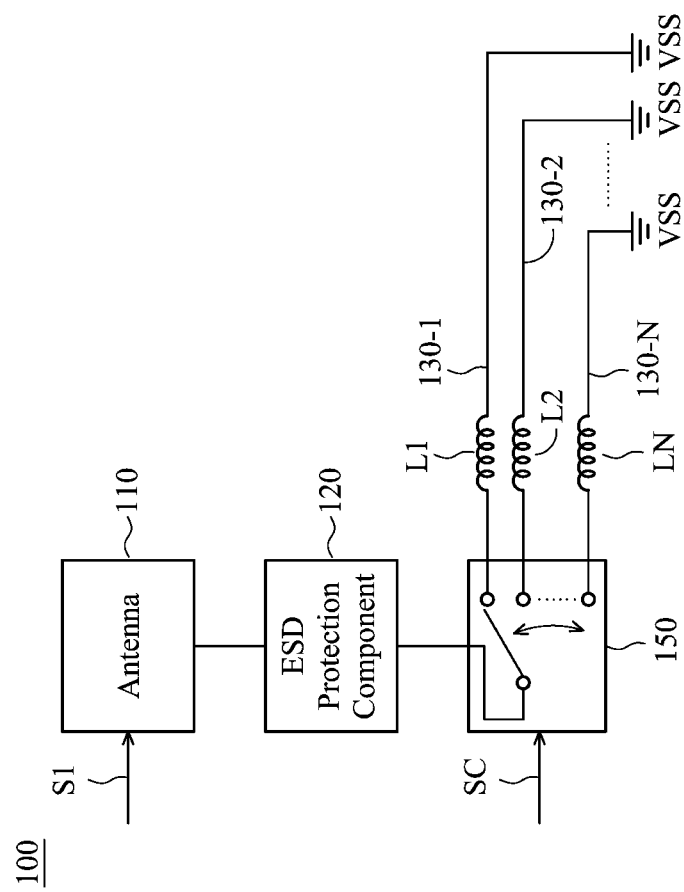
FIG. 1 is a diagram for illustrating a mobile device according to an embodiment of the invention.

FIG. 1 is a diagram for illustrating a mobile device 100 according to an embodiment of the invention. The mobile device 100 may be a smart phone, a tablet computer, or a notebook computer. As shown in FIG. 1, the mobile device 100 comprises an antenna 110, an ESD (Electrostatic Discharge) protection component 120, a plurality of branches 130-1, 130-2, . . . , and 130-N (N is a positive integer which is greater than or equal to 2), and a switch 150. The type of the antenna 110 is not restricted in the invention. For example, the antenna 110 may be a monopole antenna, a loop antenna, a slot antenna, or a PIFA (Planar Inverted F Antenna). The antenna 110 is configured to transmit and receive an RF (Radio Frequency) signal S1. The branches 130-1, 130-2, . . . , and 130-N can provide different inductances, and are respectively coupled to a ground voltage terminal VSS. In some embodiments, the branches 130-1, 130-2, . . . , and 130-N comprise a plurality of different inductors L1, L2, . . . , and LN. The inductors L1, L2, . . . , and LN may be chip inductors with different inductances. In another embodiment, the inductor L1 may be replaced with a shorted-circuit or an open-circuit. In other embodiments, the branches 130-1, 130-2, . . . , and 130-N comprise a plurality of different capacitors, which may be chip capacitors with different capacitances. The ESD protection component 120 is configured to protect the switch 150 from being damaged. The switch 150 is coupled through the ESD protection component 120 to the antenna 110, and switches a signal transmission path between the branches 130-1, 130-2, . . . , and 130-N according to a control signal SC such that the antenna 110 is capable of operating in a plurality of frequency intervals. The ESD protection component 120 is also configured to protect other active circuits (not shown) coupled to the antenna 110, such as an LNA (Low Noise Amplifier) or a PA (Power Amplifier). In a preferred embodiment, the antenna 110 is configured to transmit and receive the RF signal S1, and the frequency intervals are in a DTV (Digital Television) band and correspond to a plurality of channels. The DTV band is approximately from 170 MHz to 810 MHz. Note that the mobile device 100 may further comprise other components, for example, a processor, a battery, a display module, a touch module, a back cover, an FPCB (Flexible Printed Circuit Board), and a housing (not shown).

Figure 2:
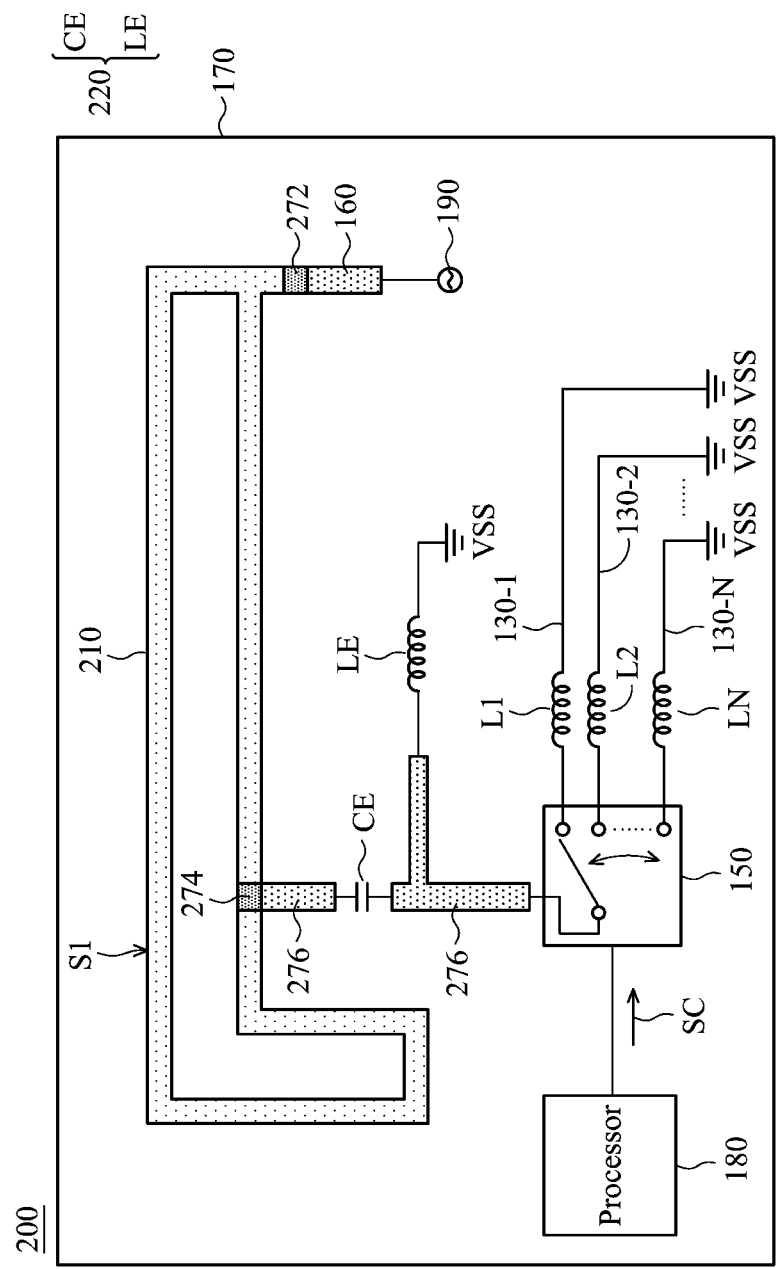
FIG. 2 is a diagram for illustrating a mobile device according to another embodiment of the invention.

FIG. 2 is a diagram for illustrating a mobile device 200 according to another embodiment of the invention. In the embodiment, the mobile device 200 comprises an antenna 210, an ESD protection component 220, a plurality of branches 130-1, 130-2, . . . , and 130-N, a switch 150, a feeding element 160, a system circuit board 170, and a processor 180. The antenna 210 is a loop antenna. The system circuit board 170 is a PCB (Printed Circuit Board). The ESD protection element 220 comprises an ESD protection capacitor CE and an ESD protection inductor LE. The ESD protection capacitor CE is coupled between the antenna 210 and the switch 150 to block a DC (Direct Current) signal. The ESD protection inductor LE is coupled between the antenna 210 and the ground voltage terminal VSS to guide an ESD current to the ground voltage terminal VSS. The ESD protection capacitor CE may be a chip capacitor, and the ESD protection inductor LE may be a chip inductor. If the ESD protection component 220 is included, the switch 150 will not be damaged by excessive currents from the antenna 210. Note that the ESD protection component 220 may merely include either the ESD protection capacitor CE or the ESD protection inductor LE. In some embodiments, a capacitance of the ESD protection capacitor CE is approximately from 1 pF to 100 pF, and an inductance of the ESD protection inductor LE is approximately from 1 nH to 100 nH. To prevent the operation of the switch 150 from being affected by the ESD protection inductor LE, the ESD protection inductor LE should be disposed away from the switch 150 and the branches 130-1, 130-2, ..., and 130-N, and may be further coupled to a different ground position from them.

The feeding element 160 is coupled to a signal source 190, and is configured to excite the antenna 210. As shown in FIG. 2, the feeding element 160 is directly coupled to the antenna 210. The antenna 210 and other components of the mobile device 200 may be located on different planes. For example, the antenna 210 may be disposed on an FPCB (not shown) of the mobile device 200, or may be disposed at any position of a back cover or a housing (not shown) of the mobile device 200 by LDS (Laser Direct Structuring) technology. The feeding element 160 may be a conductive trace disposed on the system circuit board 170, and is coupled through a connection element 272 to the antenna 210. The antenna 210 may also be coupled through another connection element 274 and another conductive trace 276 disposed on the system circuit board 170 to the ESD protection component 220 and the switch 150. In some embodiments, the connection elements 272 and 274 are metal springs or pogo pins. Note that the invention is not limited to the above. In other embodiments, the antenna 210 is a planar antenna printed on the system circuit board 170, and in this case, the connection elements 272 and 274 are removed from the mobile device 200.

The processor 180 is coupled to the switch 150 and the antenna 210, and performs a selection procedure to generate the control signal SC. The selection procedure will be illustrated in detail in the following paragraph. Other features of the mobile device 200 of FIG. 2 are similar to those of the mobile device 100 of FIG. 1. Accordingly, the two embodiments have similar performances.

Figure 3:
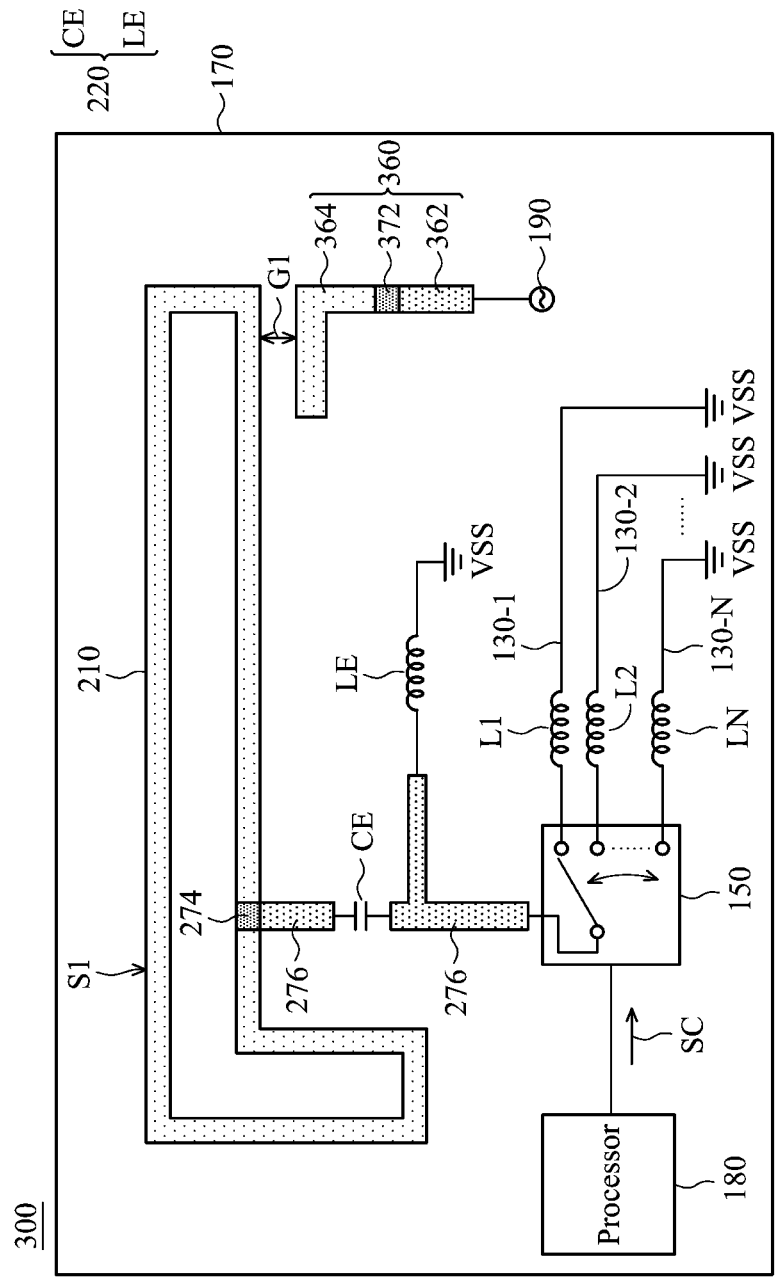
FIG. 3 is a diagram for illustrating a mobile device according to an embodiment of the invention.

FIG. 3 is a diagram for illustrating a mobile device 300 according to an embodiment of the invention. FIG. 3 is similar to FIG. 2. The difference between them is that a feeding element 360 of the mobile device 300 is not directly coupled to the antenna 210. As shown in FIG. 3, the feeding element 360 is close to the antenna 210, and a coupling gap G1 is formed between the feeding element 360 and the antenna 210. In some embodiments, the feeding element 360 comprises a conductive trace 362, a connection element 372, and a conductive extension element 364. The conductive trace 362 is disposed on the system circuit board 170. The conductive extension element 364 and the antenna 210 are disposed on a same carrier. The connection element 372 is coupled between the conductive trace 362 and the conductive extension element 364. The connection element 372 may be a metal spring or a pogo pin. Note that the invention is not limited to the above, and any indirectly-feeding method may be applied to the invention, for example, a broadside-coupled method and an edge-coupled method. Other features of the mobile device 300 of FIG. 3 are similar to those of the mobile device 200 of FIG. 2. Accordingly, the two embodiments have similar performances.

Figure 4:
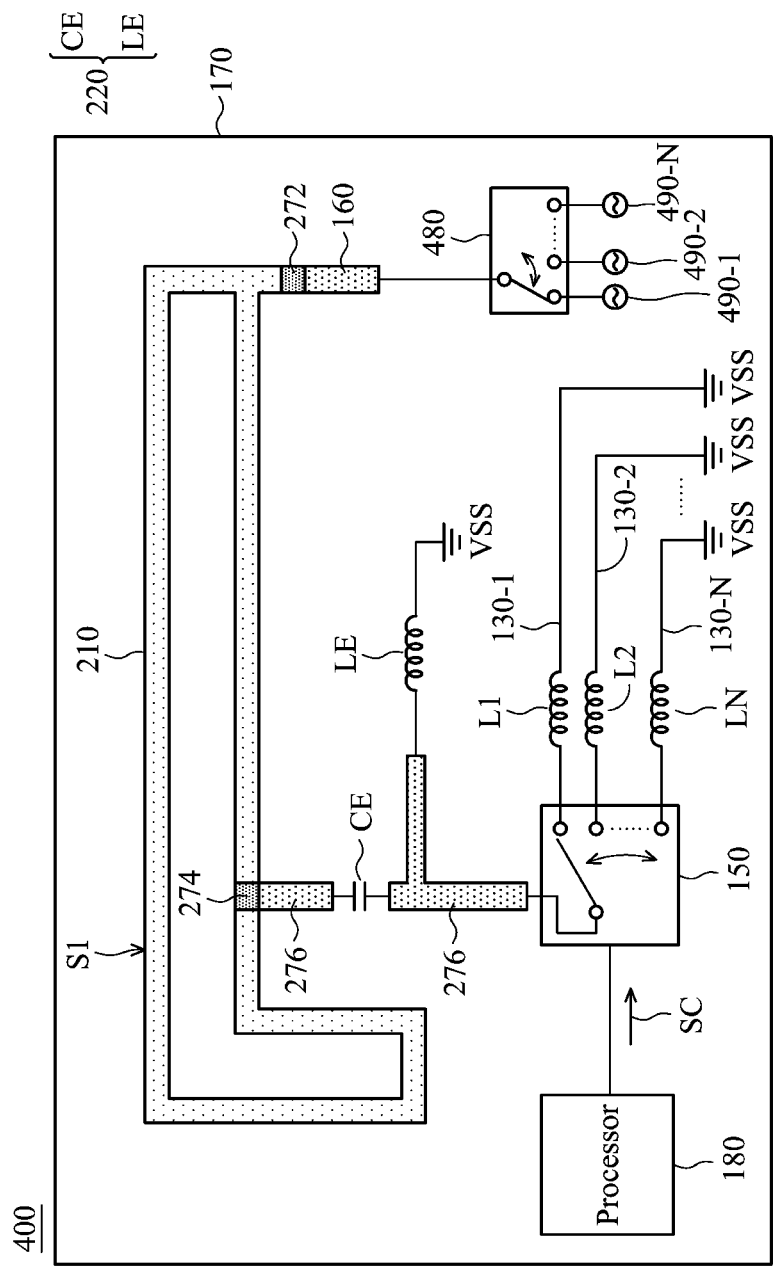
FIG. 4 is a diagram for illustrating a mobile device according to another embodiment of the invention.

FIG. 4 is a diagram for illustrating a mobile device 400 according to another embodiment of the invention. FIG. 4 is similar to FIG. 2. The difference between them is that the mobile device 400 further comprises a controller 480 and that a plurality of signal sources 490-1, 490-2, ..., and 490-M (M is a positive integer which is greater than or equal to 2) correspond to different bands, respectively. The controller 480 may be a tunable filter or a switch. The controller 480 is selectively coupled to one of the signal sources 490-1, 490-2, ..., and 490-M to excite the antenna 210 such that the antenna 210 is capable of operating in multiple bands, for example, a DTV band, a GPS (Global Positioning System) band, a Div (Diversity) band, a Bluetooth band, a Wi-Fi band, and/or a WLAN (Wireless Local Area Network) band. Accordingly, different communication units may share a single antenna 210 to transmit or receive signals. Other features of the mobile device 400 of FIG. 4 are similar to those of the mobile device 200 of FIG. 2. Accordingly, the two embodiments have similar performances.

Figure 5:
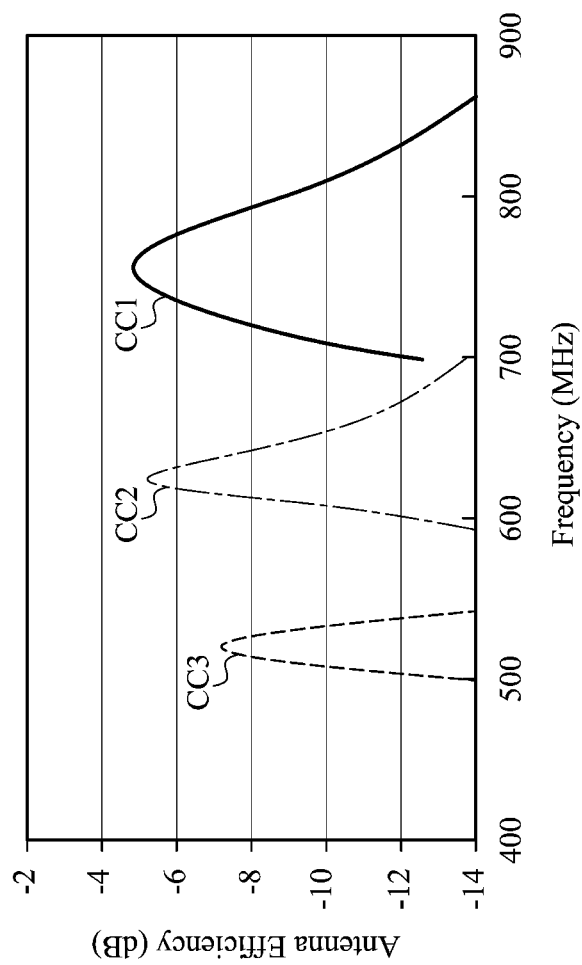
FIG. 5 is a diagram for illustrating antenna efficiency of a mobile device according to an embodiment of the invention.

FIG. 5 is a diagram for illustrating antenna efficiency of the mobile device 100 according to an embodiment of the invention. The horizontal axis represents operation frequency (MHz), and the vertical axis represents antenna efficiency (dB). In the embodiment, the antenna 110 of the mobile device 100 operates in a DTV band. By switching between the plurality of branches 130-1, 130-2, ..., and 130-N that have different inductances, the antenna 110 is capable of operating in a plurality of frequency intervals inside the DTV band such that the mobile device 100 is capable of receiving the RF signal S1 of different bands. For example, the branches 130-1, 130-2, ..., and 130-N can provide at least three different inductances. When the switch 150 switches to a first inductance (e.g., 5 nH), the antenna efficiency of the antenna 110 is shown as the curve CC1. When the switch 150 switches to a second inductance (e.g., 10 nH), the antenna efficiency of the antenna 110 is shown as the curve CC2. When the switch 150 switches to a third inductance (e.g., 40 nH), the antenna efficiency of the antenna 110 is shown as the curve CC3. In the embodiment, as the switched inductance is increased, the operated frequency interval of the antenna 110 shifts to lower bands.

Figure 6:
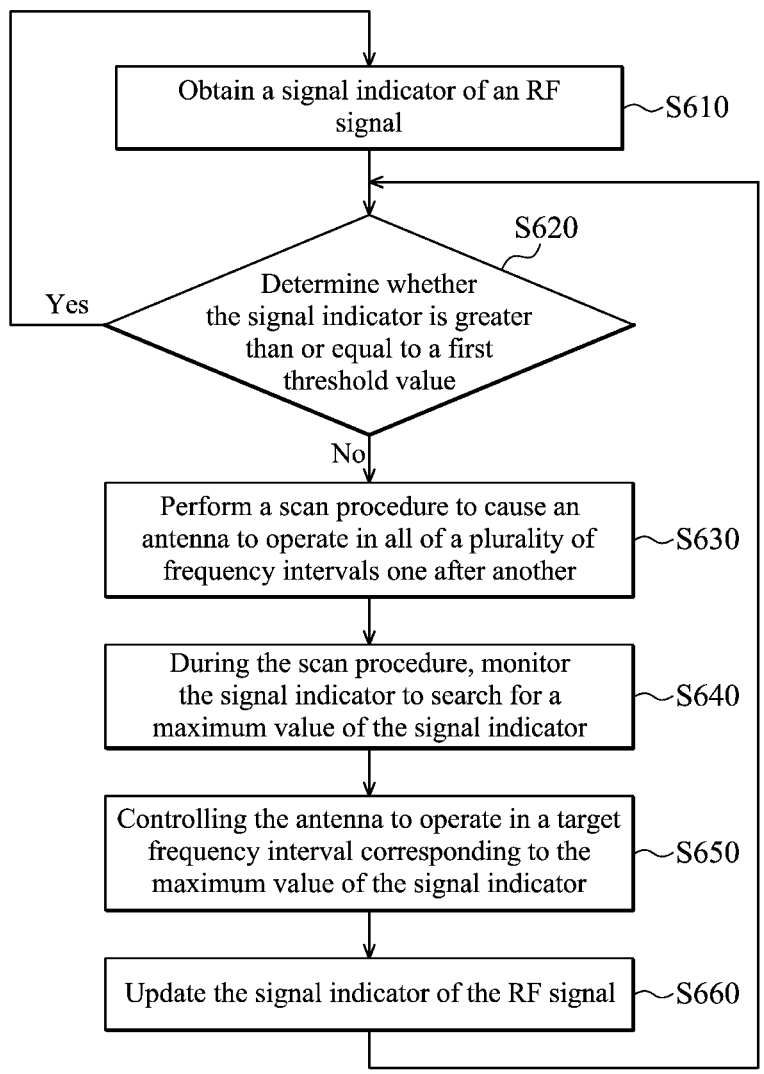
FIG. 6 is a flowchart for illustrating a selection procedure according to an embodiment of the invention.

FIG. 6 is a flowchart for illustrating the selection procedure according to an embodiment of the invention. All steps of the selection procedure are periodically performed by the processor 180. To begin, in step S610, a signal indicator of the RF signal S1 is obtained by the antenna 210. The signal indicator may be an SNR (Signal-to-Noise Ratio) or an RSSI (Received Signal Strength Indicator). In step S620, whether the signal indicator is greater than or equal to a first threshold value is determined. If so, the selection procedure may be performed again after a predetermined period of time. If not, in step S630, a scan procedure is performed to cause the antenna 210 to operate in all of the frequency intervals one after another. The scan procedure may be performed from the highest frequency interval to the lowest frequency interval. In step S640, during the scan procedure, the signal indicator is monitored to search for a maximum value of the signal indicator. In step S650, the antenna 210 is controlled to operate in a target frequency interval corresponding to the maximum value of the signal indicator. The step of controlling the antenna 210 to operate in the target frequency interval is performed by controlling the switch 150 to switch between the branches 130-1, 130-2, ..., and 130-N. In step S660, the signal indicator of the RF signal is updated. That is, the original signal indicator is replaced with a current signal indicator. Next, going back to step S620, the selection procedure is performed repeatedly.

In some embodiments, the selection procedure of FIG. 6 further comprises the following steps. A packet lost number of the RF signal is obtained. Whether the packet lost number is greater than a second threshold value is determined. In this case, the scan procedure and its following steps S630-S650 are performed only if the signal indicator is smaller than the first threshold value, and the packet lost number is greater than the second threshold value.

Figure 7:
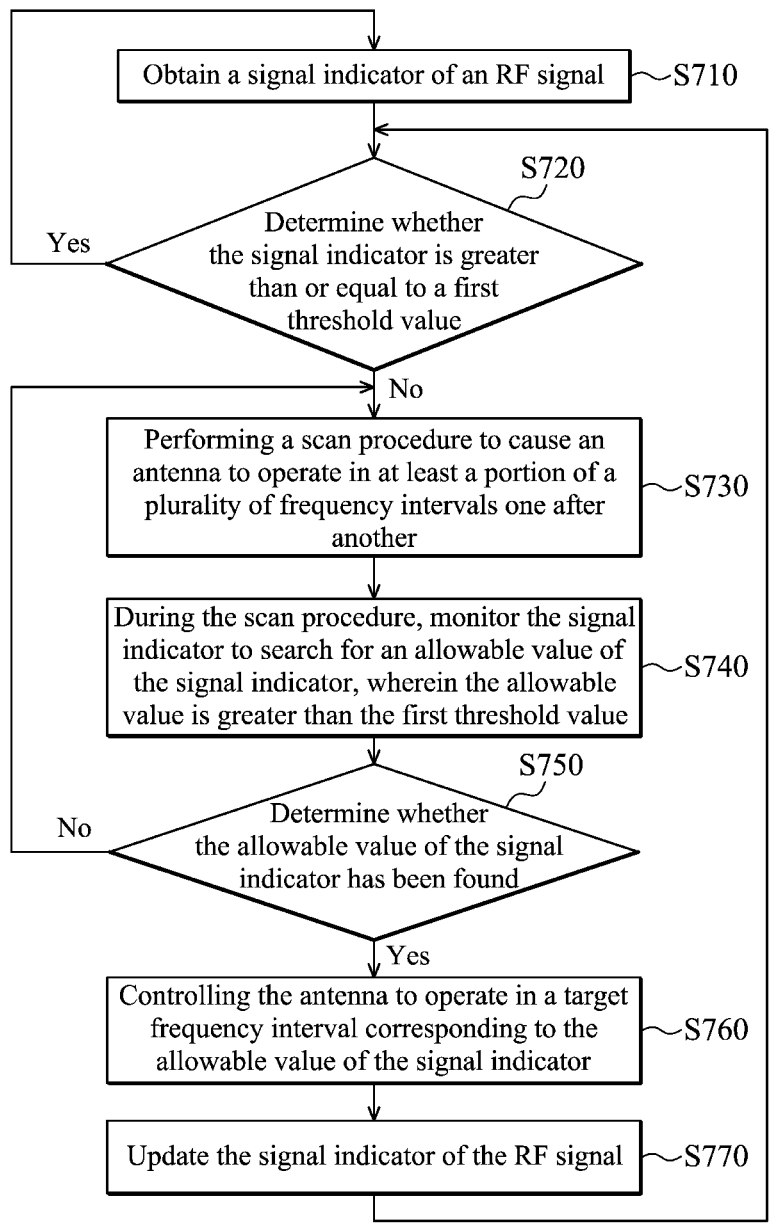
FIG. 7 is a flowchart for illustrating a selection procedure according to another embodiment of the invention.

FIG. 7 is a flowchart for illustrating the selection procedure according to another embodiment of the invention. All steps of the selection procedure are periodically performed by the processor 180. To begin, in step S710, a signal indicator of the RF signal S1 is obtained by the antenna 210. The signal indicator may be an SNR or an RSSI. In step S720, whether the signal indicator is greater than or equal to a first threshold value is determined. If so, the selection procedure may be performed again after a predetermined period of time. If not, in step S730, a scan procedure is performed to cause the antenna 210 to operate in at least a portion of the frequency intervals one after another. In step S740, during the scan procedure, the signal indicator is monitored to search for an allowable value of the signal indicator, wherein the allowable value is greater than the first threshold value. In an embodiment, the scan procedure is performed from the highest frequency interval to the lowest frequency interval. In another embodiment, the scan procedure is performed from a middle frequency interval to the highest frequency interval, and then from the middle frequency interval to the lowest frequency interval. In step S750, whether the allowable value of the signal indicator has been found is determined. If not, the processor 180 continues to perform the scan procedure. If so, in step S760, the antenna 210 is controlled to operate in a target frequency interval corresponding to the allowable value of the signal indicator. The step of controlling the antenna 210 to operate in the target frequency interval is performed by controlling the switch 150 to switch between the branches 130-1, 130-2, . . . , and 130-N. In step S770, the signal indicator of the RF signal is updated. That is, the original signal indicator is replaced with a current signal indicator. Next, going back to step S720, the selection procedure is performed repeatedly.

In some embodiments, the selection procedure of FIG. 7 further comprises the following steps. A packet lost number of the RF signal is obtained. Whether the packet lost number is greater than a second threshold value is determined. In this case, the scan procedure and its following steps S730-S760 are performed only if the signal indicator is smaller than the first threshold value, and the packet lost number is greater than the second threshold value.

When a conductive object is close to the antenna 210 of the mobile device 200, the operation band of the antenna 210 may shift away from the predetermined range. By performing the selection procedures shown in FIGS. 6 and 7, the mobile device 200 can select an appropriate operation band automatically, and the conductive object does not affect the communication quality much.

The subject application provides a novel mobile device and a compact tunable antenna therein, which can cover multiple frequency intervals and have allowable radiation performances. The subject application may be implemented with mature PCB technology and easily applied to a variety of small communication devices.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A mobile device, comprising:
an antenna, transmitting and receiving an RF (Radio Frequency) signal;
an ESD (Electrostatic discharge) protection component;
a plurality of branches, providing different inductances or capacitances, and respectively coupled to a ground voltage terminal; and
a switch, coupled through the ESD protection component to the antenna, and switching between the branches according to a control signal such that the antenna is capable of operating in a plurality of frequency intervals,
wherein the ESD protection component is configured to protect the switch from being damaged,
wherein the mobile device further comprises:
a processor, coupled to the switch and the antenna, and performing a selection procedure to generate the control signal, and
wherein the selection procedure comprises the steps of:
obtaining, by the antenna, a signal indicator of the RF signal;
determining, by the processor, whether the signal indicator is greater than or equal to a first threshold value;
if not, performing a scan procedure to cause the antenna to operate in all of the frequency intervals one after another;
during the scan procedure, monitoring, by the processor, the signal indicator to search for a maximum value of the signal indicator; and
controlling the antenna to operate in a target frequency interval corresponding to the maximum value of the signal indicator.

2. The mobile device as claimed in claim 1, wherein the ESD protection component comprises an ESD protection capacitor, and the ESD protection capacitor is coupled between the antenna and the switch to block a DC (Direct Current) signal.

3. The mobile device as claimed in claim 2, wherein a capacitance of the ESD protection capacitor is approximately from 1 pF to 100 pF.

4. The mobile device as claimed in claim 1, wherein the ESD protection component comprises an ESD protection inductor, and the ESD protection inductor is coupled between the antenna and the ground voltage terminal to guide an ESD current to the ground voltage terminal.

5. The mobile device as claimed in claim 4, wherein the ESD protection inductor is disposed away from the switch and the branches.

6. The mobile device as claimed in claim 4, wherein an inductance of the ESD protection inductor is approximately from 1 nH to 100 nH.

7. The mobile device as claimed in claim 1, wherein the branches comprise a plurality of inductors or a plurality of capacitors.

8. The mobile device as claimed in claim 1, wherein the antenna is a monopole antenna, a loop antenna, a slot antenna, or a PIFA (Planar Inverted F Antenna).

9. The mobile device as claimed in claim 1, further comprising:
a feeding element, coupled to a signal source, and configured to excite the antenna.

10. The mobile device as claimed in claim 9, wherein the feeding element is directly coupled to the antenna.

11. The mobile device as claimed in claim 9, wherein a coupling gap is formed between the feeding element and the antenna.

12. The mobile device as claimed in claim 9, further comprising:
  a PCB (Printed Circuit Board), wherein the feeding element is a conductive trace disposed on the PCB.

13. The mobile device as claimed in claim 1, wherein when the RF signal received by the antenna is in a DTV (Digital Television) band, and the frequency intervals are approximately from 170 MHz to 810 MHz.

14. The mobile device as claimed in claim 1, further comprising:
  a controller, selectively coupled to one of a plurality of signal sources to excite the antenna such that the antenna is capable of operating in a DTV (Digital Television) band, a GPS (Global Positioning System) band, a Div (Diversity) band, a Bluetooth band, a Wi-Fi band, and/or a WLAN (Wireless Local Area Network) band.

15. The mobile device as claimed in claim 1, wherein the scan procedure is performed from the highest frequency interval to the lowest frequency interval.

16. The mobile device as claimed in claim 1, wherein the selection procedure further comprises:
  obtaining, by the processor, a packet lost number of the RF signal; and
  determining, by the processor, whether the packet lost number is greater than a second threshold value,
  wherein the scan procedure is performed only if the signal indicator is smaller than the first threshold value and the packet lost number is greater than the second threshold value.

17. A mobile device, comprising:
  an antenna, transmitting and receiving an RF (Radio Frequency) signal;
  an ESD (Electrostatic discharge) protection component;
  a plurality of branches, providing different inductances or capacitances, and respectively coupled to a ground voltage terminal; and
  a switch, coupled through the ESD protection component to the antenna, and switching between the branches according to a control signal such that the antenna is capable of operating in a plurality of frequency intervals,
  wherein the ESD protection component is configured to protect the switch from being damaged,
  wherein the mobile device further comprises:
  a processor, coupled to the switch and the antenna, and performing a selection procedure to generate the control signal, and
  wherein the selection procedure comprises the steps of:
  obtaining, by the antenna, a signal indicator of the RF signal;
  determining, by the processor, whether the signal indicator is greater than a first threshold value;
  if not, performing a scan procedure to cause the antenna to operate in at least a portion of the frequency intervals one after another;
  during the scan procedure, monitoring, by the processor, the signal indicator to search for an allowable value of the signal indicator, wherein the allowable value is greater than the first threshold value; and
  controlling the antenna to operate in a target frequency interval corresponding to the allowable value of the signal indicator.

18. The mobile device as claimed in claim 17, wherein the scan procedure is performed from the highest frequency interval to the lowest frequency interval.

19. The mobile device as claimed in claim 17, wherein the scan procedure is performed from a middle frequency interval to the highest frequency interval, and then from the middle frequency interval to the lowest frequency interval.

20. The mobile device as claimed in claim 17, wherein the selection procedure further comprises:
  obtaining, by the processor, a packet lost number of the RF signal; and
  determining, by the processor, whether the packet lost number is greater than a second threshold value,
  wherein the scan procedure is performed only if the signal indicator is smaller than the first threshold value and the packet lost number is greater than the second threshold value.

* * * * *